United States Patent
Takahashi et al.

(10) Patent No.: US 6,219,517 B1
(45) Date of Patent: Apr. 17, 2001

(54) IMAGE FORMING APPARATUS FOR CORRECTING SUPERIMPOSITION ERROR

(75) Inventors: Kazunobu Takahashi; Kyosuke Taka, both of Nara; Hidekazu Sakagami, Sakurai; Nobuo Manabe, Yamatokoriyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/428,015

(22) Filed: Oct. 27, 1999

(30) Foreign Application Priority Data

Oct. 30, 1998 (JP) .................................................. 10-311032

(51) Int. Cl.$^7$ ................................................ G03G 15/01
(52) U.S. Cl. ............................................ 399/301; 347/116
(58) Field of Search ...................... 399/298, 299, 399/300, 301; 347/115, 116

(56) References Cited

U.S. PATENT DOCUMENTS

| | | | |
|---|---|---|---|
| 5,510,885 | * 4/1996 | Mori et al | 347/116 X |
| 5,523,823 | * 6/1996 | Ashikaga | 399/301 X |
| 5,587,771 | * 12/1996 | Mori et al. | 347/116 X |
| 5,872,586 | * 2/1999 | Shio | 347/116 |
| 5,887,125 | * 3/1999 | Takano et al. | 347/116 X |
| 5,909,235 | * 6/1999 | Folkins | 347/116 X |
| 6,008,826 | * 12/1999 | Foote et al. | 347/116 |
| 6,035,076 | * 3/2000 | Nagase | 347/116 X |

FOREIGN PATENT DOCUMENTS

| | | |
|---|---|---|
| 63-286864 | 11/1988 | (JP) . |
| 9-30051 | 2/1997 | (JP) . |

* cited by examiner

*Primary Examiner*—Sandra Brase
(74) *Attorney, Agent, or Firm*—Dike, Bronstein, Roberts & Cushman, LLP; David G. Conlin; David A. Tcuker (57) ABSTRACT

A registration pattern data generating portion is configured of a pattern set data generator for rough order error estimation and a pattern set data generator for fine order error estimation. When an error is estimated, a pattern set for rough order error estimation is checked first so as to roughly determine the size of the error and then another pattern set for fine order error estimation is checked so as to finely determine the size of the error. Thus, checking the two types of pattern sets makes it possible to exactly recognize the error in rough and fine units, providing fast and exact error determination.

9 Claims, 6 Drawing Sheets

|  |  | BLACK | COLOR | REFERENCE |
|---|---|---|---|---|
| ROUGH ADJUSTMENT | PRINT PATTERN | 50 by 50 | 50 by 50 | 100 PITCH ON BOTH SIDE FOR Bk |
|  | ADJUSTMENT STEP |  | 10 DOTS |  |
| FINE ADJUSTMENT 1 | PRINT PATTERN | 10 by 5 | 5 by 10 | AT LEAST 15 PATTERNS NEEDED |
|  | ADJUSTMENT STEP |  | 1 DOT |  |
| FINE ADJUSTMENT 2 | PRINT PATTERN | 6 by 2 | 2 by 6 |  |
|  | ADJUSTMENT STEP |  | 1 DOT |  |
| FINE ADJUSTMENT 3 | PRINT PATTERN | 3 by 1 | 1 by 3 |  |
|  | ADJUSTMENT STEP |  | 1 DOT |  |

IMAGE FORMING APPARATUS FOR CORRECTING SUPERIMPOSITION ERROR

BACKGROUND OF THE INVENTION (1) Field of the Invention

The present invention relates to an image forming apparatus which reproduces a color image by superimposing multiple images of different colors reproduced based on a color image signal. More detailedly, the present invention relates to an image forming apparatus wherein a registration pattern for correcting color misregistration is formed on the actual printing medium so as to determine the conveyed state of the printing medium in the transfer step, mechanical problems (conveyance irregularity) in the transfer portion etc.

(2) Description of the Prior Art

Color image forming apparatuses have been known in which a color image is picked up as image data of Y(yellow), M(magenta), C(cyan) and Bk(black) and the image data of different colors are transferred to their corresponding recording portions to be reproduced as color separations and the color separated images are sequentially superimposed to thereby reproduce a color image.

Color image forming apparatuses of this type suffer from the problem in that a correct color image cannot be reproduced if each color separated image cannot be exactly laid over the others. Therefore, how this problem is solved is the key to the technical development of this field.

The main factors of misregistration of superimposition of different color separations can be described as follows:

That is, the main factors include: driving irregularities occurring during rotational drivings of the photosensitive members on which different color-separated images are recorded; inclination of the laser beam, as it sweeps to record an image on the photosensitive member, in the main scan direction (the axial direction of the photosensitive member) with respect to the photosensitive member; deviation of the point to be recorded on the photosensitive member by the laser beam with respect to the rotational direction of the photosensitive member (the auxiliary scan direction); and rotational driving irregularities of the printing media conveying belt for conveying printing media.

Conventionally, in order to assure superimposition of the images reproduced by coloring materials of different colors (Y, M, C and Bk), the above mechanical error causing factors (irregularities and fluctuations in various parts) were attempted to be eliminated by making adjustment to mechanical parts in assembly.

However, there is a limit to the mechanical countermeasures (adjustment). So, the final adjustment needs electric control such as timing control of start of writing the image by the laser beam.

As a usually used example, a means has been known which forms trial registration patterns of the colors on the image transfer-conveyance belt, reads the toner images of these registration patterns by means of an optical sensor so as to check the positional relationship between the toner images and compensates for the positional errors of the image formed, produced by the individual, color image forming portions (Japanese Patent Application Laid-Open Sho. 63 No. 286864).

However, in a configuration as above where registration patterns are formed on the transfer belt, there was a problem in that the positions of the registration patterns could not be determined correctly by the optical sensor.

This is because it is difficult to determine whether light incident to the optical sensor is the reflected light from the surface of the image transfer-conveyance belt or the reflected light from the registration patterns of the toner image (registration adjustment pattern image). Though the detected output signal from the sensor is processed through amplifiers, filters, and the like, it is still difficult to acquire correct information because of influence of noise, signal fluctuations, etc.

Another method has been devised and proposed in which the registration patterns of the component colors are actually transferred and formed on the printing medium onto which the final color image is to be reproduced so that correction information for reproducing the image of each component color is obtained based on the state of the forming position of the registration pattern for the component color (see Japanese Patent Application Laid-Open Hei 9 No.30051).

As stated above, color image forming apparatus involves a number of error (color misregistration) causing factors in various mechanical parts. So, assuming that errors of different parts exhibit the greatest large combined effect, the means disclosed in Japanese Patent Application Laid-Open Hei 9 No.30051, needs to have a number of timing adjustment patterns prepared beforehand and determine one ideal registration pattern from those patterns.

Therefore, if the system involves a large number of error causing factors and/or if some factors produce errors of distinct values, a large number of registration patterns need to be prepared beforehand for error estimation, which necessitate a lot of time and labor for data setting, printing etc., as well as a time consuming process for error determination. Moreover, it might happen that one sheet of paper is not enough to print the registration pattern, posing a problem of handling inconvenience.

SUMMARY OF THE INVENTION

It is therefore an object of the present invention to provide an image forming apparatus which makes easy and exact determination of misregistrations of image forming of the component colors using a few and simple registration pattern configurations and eliminates factors causing error beforehand so as to form a high quality color image.

In this invention, the term "rectangle" means each registration pattern, the term "rectangular pattern" means the arrangement of a plurality of registration patterns.

In order to achieve the above object, the present invention is configured as follows:

In accordance with the first aspect of the invention, an image forming apparatus includes:

a first image forming portion forming an image on a printing medium with a coloring material of the first color in accordance with an image data;

a second image forming portion which superimposes a second image formed of a coloring material of the second color in accordance with an image data inputted, over and in register with the image formed on the printing medium by the first image forming portion; and a data supplying portion for supplying the predetermined image data to the first and second image forming portions, wherein the data supplying portion comprises:

a reproduction image data generating portion for outputting the data relating to a reproduction image to be formed on the printing medium; and a registration pattern data generating portion for generating registration pattern data for determining the positioning error or misregistration in image formation of the image formed by the second image forming portion relative to the predetermined position of the image reproduced by the first image forming portion, the registration pattern data generating portion includes a plurality of pattern data generators for generating registration pattern data corresponding to the magnitudes of the error to be estimated, and each pattern data generator comprises:

a first-color pattern set data generator for generating a first-color pattern set data which is used to form a plurality of first-color rectangles to be formed with the first color, apart from each other by a first pattern interval; and a second-color pattern set data generator for generating a second-color pattern set data which is used to form a plurality of second-color rectangles to be formed with the second color, apart from each other by a second pattern interval which is different by the predetermined amount from the first pattern interval, and is characterized in that misregistration in image formation of the image formed by the second image forming portion relative to the predetermined position of the image formed by the first image forming portion can be estimated based on the positional relationship between a rectangular pattern formed by the first image forming portion based on the first-color pattern set data and a rectangular pattern formed by the second image forming portion based on the second-color pattern set data while each of the pattern data generators generates data enabling determination of an error in different, or larger and smaller units. The image forming apparatus further comprises: an input portion through which correction information for correcting the error or misregistration in image formation is input; and a control portion for controlling at least one of the first and second image forming portions in accordance with the correction information input through the input portion.

In accordance with the second aspect of the invention, an image forming apparatus comprises:

a first image forming portion forming an image on a printing medium with a coloring material of the first color in accordance with an image data inputted in accordance with an image data;

a second image forming portion which superimposes a second image formed of a coloring material of the second color in accordance with an image data inputted, over and in register with the image formed on the printing medium by the first image forming portion; and a data supplying portion for supplying the predetermined image data to the first and second image forming portions, wherein the data supplying portion comprises:

a reproduction image data generating portion for outputting the data relating to a reproduction image to be formed on the printing medium; and a registration pattern data generating portion for generating registration pattern data for determining the positioning error or misregistration in image formation of the image formed by the second image forming portion relative to the predetermined position of the image reproduced by the first image forming portion, the registration pattern data generating portion includes a rough error estimation pattern set data generator for estimating a large error and a fine error estimation pattern set generator for estimating a small error, the rough error estimation pattern set data generator comprises:

a first pattern set data generator for generating a first pattern set data which is used to form a plurality of first pattern rectangles to be formed with the first color, apart from each other by a first pattern interval; and a second pattern set data generator for generating a second pattern set data which is used to form a plurality of second pattern rectangles to be formed with the second color, apart from each other by a second pattern interval which is different by the predetermined amount from the first pattern interval, and the fine error estimation pattern set data generator comprises:

a third pattern set data generator for generating a third pattern set data which is used to form a plurality of third pattern rectangles to be formed with the first color, apart from each other by a third pattern interval which is smaller than the first pattern interval; and a fourth pattern set data generator for generating a fourth pattern set data which is used to form a plurality of fourth pattern rectangles to be formed with the second color, apart from each other by a fourth pattern interval which is smaller than the second pattern interval, and is characterized in that a rough error or misregistration in image formation of the image formed by the second image forming portion relative to the predetermined position of the image formed by the first image forming portion can be estimated based on the positional relationship between a rectangular pattern formed by the first image forming portion based on the first pattern set data and a rectangular pattern formed by the second image forming portion based on the second pattern set data; and a fine error or misregistration in image formation of the image formed by the second image forming portion relative to the predetermined position of the image formed by the first image forming portion can be estimated based on the positional relationship between a rectangular pattern formed by the first image forming portion based on the third pattern set data and a rectangular pattern formed by the second image forming portion based on the fourth pattern set data. The image forming apparatus further comprises: an input portion through which correction information for correcting the large and small errors or misregistration in image formation is input; and a control portion for collecting at least one of the first and second image forming portions in accordance with the correction information input through the input portion.

In accordance with the third aspect of the invention, the image forming apparatus having the above second aspect is characterized in that the intervals between neighboring rectangles based on the third and fourth pattern set data are set at 1/N (N is an integer) of the intervals between the neighboring rectangles based on the first and second pattern set data, respectively.

In accordance with the fourth aspect of the invention, the image forming apparatus having one of the above second or third aspect is characterized in that the widths of the rectangles in the second and fourth rectangular patterns are set equal to the intervals between the rectangles in the first and third rectangular patterns, respectively.

In accordance with the fifth aspect of the invention, the image forming apparatus having one of the above first through fourth aspect is characterized in that the coloring material of the first color is a black one and the coloring material of the second color is one of the component color material for reproducing a color image.

In accordance with the sixth aspect of the invention, the image forming apparatus having one of the above first through fifth aspect is characterized in that the registration pattern data generating portion generates registration pattern data for forming registration patterns along the auxiliary scan direction or the moving direction of the image transfer-conveyance belt and along the main scan direction that is perpendicular to the auxiliary scan direction.

In the first aspect of the invention, misregistration in image formation of each component color image can be estimated using pattern sets having different units. Therefore, an error can be determined roughly by first checking the pattern set of a larger unit then finely checking the pattern set of a smaller unit, whereby it is possible to perform quick and exact determination of the error. So, this configuration is markedly effective in performing error correction.

For example, in the second aspect of the invention, the registration pattern data generating portion is configured of the rough error estimation pattern set data generating portion and the fine error estimation pattern set data generating portion. Therefore, when an error is determined, at first the rough error estimation pattern set is checked so as to determine the rough value of the error and then the fine error estimation pattern set is checked so as to determine the fine value of the error. Therefore, in the invention of the second aspect, checking only the two pattern sets enables exact determination of an error across two, larger and smaller units, making it possible to perform exact and fast misregistration determination.

In the third aspect of the invention, use of the fine error estimation pattern set, i.e., the third and fourth pattern set data enables the determination of an error up to 1/N precision of that performed by the pattern data set for rough order error estimation.

In the fourth aspect of the invention, by confirming that the rectangles in the second and fourth rectangular patterns fit the intervals of the first and third rectangular patterns, respectively, the value of misregistration can be determined at first sight, thus making it possible to perform faster and easier determination.

As in the fifth aspect of the invention, when the first coloring material is a black one and the second coloring material is a chromatic one, the overlap between the rectangular pattern of the first color and the rectangular pattern of the second color can be easily recognized, thus enabling a further exact and simple determination.

Further, as in the sixth aspect of the invention, the configuration of a registration pattern along both the main and auxiliary scan directions makes it possible to perform image correction in two orthogonal directions, further enhancing the precision of the error determination.

BRIEF DESCRIPTION OF THE DRAWINGS

FIG. 5B is an enlarged plan view showing a state where the registration pattern formed by the chromatic coloring material is in register; and FIG. 6 is a enlarged plan view showing part of the registration pattern formed by the second embodiment of the invention, FIG. 6A showing a state where the rectangular pattern formed by a chromatic coloring material is not in register, FIG. 6B showing a state where the rectangular pattern formed by a chromatic coloring material is in register.

DESCRIPTION OF THE PREFERRED EMBODIMENTS

The embodiment of the invention will hereinafter be described with reference to the accompanying drawings.

Figure 1:
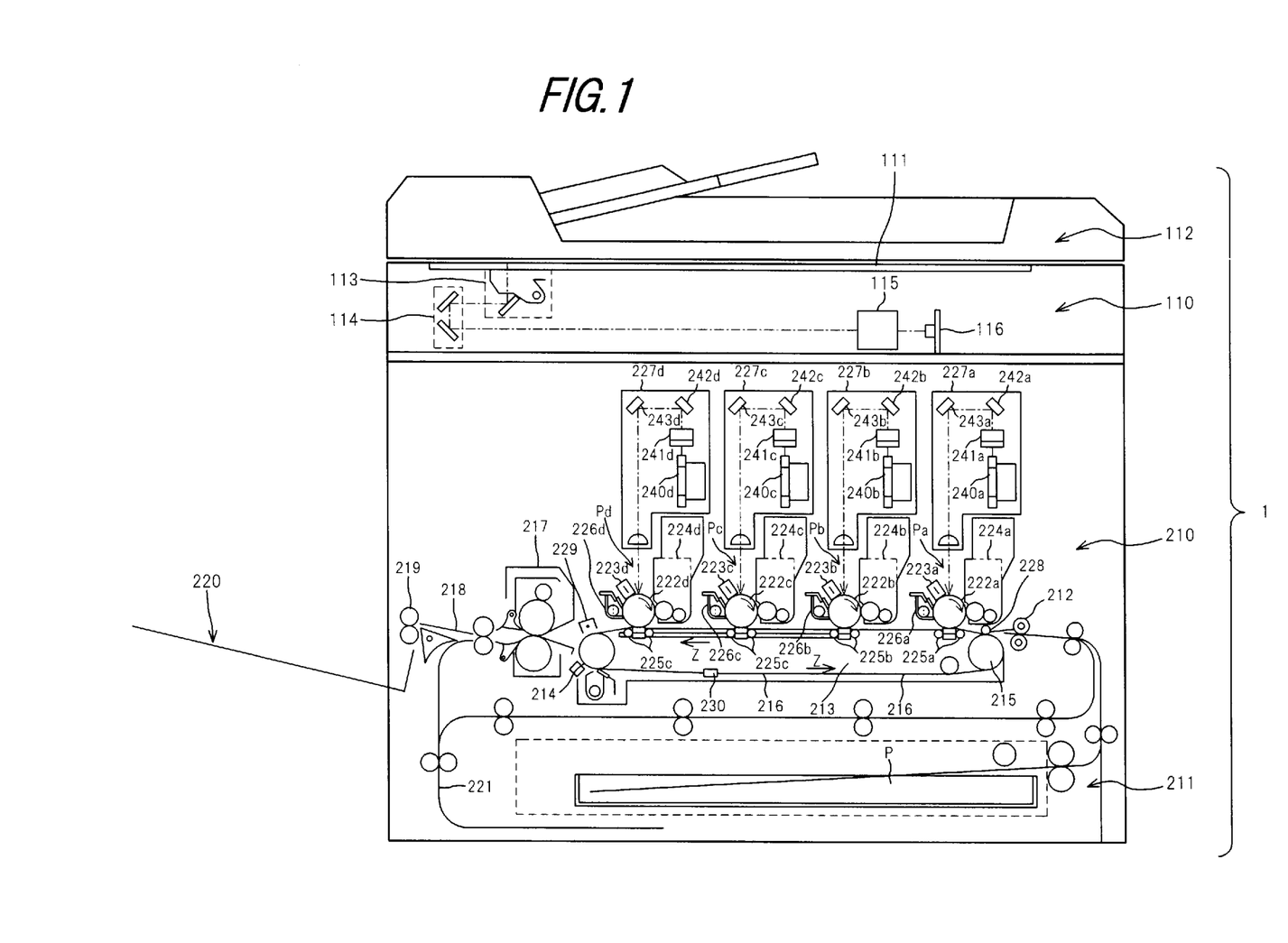
FIG. 1 is a front view showing the internal configuration of a digital color copier in accordance with the embodiment of the invention.

FIGS. 1 to 6 show the first embodiment of the invention. FIG. 1 is an illustrative front view showing the internal configuration of a digital color copier 1 as an image forming apparatus in accordance with the embodiment of the invention.

In FIG. 1, an original table 111 and a control panel are arranged on the top face of copier body 1 while an image reading portion 110 and image forming portion 210 are arranged inside copier body 1. A reversing automatic document feeder (RADF) 112 is attached on the top surface of original table 111 in the predetermined position with respect to original table 111 surface, whilst being supported so as to be opened and closed relative to original table 111.

RADF 112, first, conveys an original so that the one side of the original opposes image reading portion 110 at the predetermined position on original table 111. After the image scanning of this side is completed, the original is inverted so that the other side will oppose image reading portion 110, and is conveyed to original table 111. Then, when RADF 112 completes image scanning of both sides of one original, the original is discharged and the duplex copy conveying operation for a next document is effected.

The operation of the conveyance and face inversion of the original is controlled in association with the whole copier operation. That is, image reading portion 110 is disposed below original table 111 in order to read the image of the original conveyed onto original table 111 by means of RADF 112. Image reading portion 110 includes original scanning portion 113 and 114 which reciprocates along, and in parallel to, the undersurface of original table 111, an optical lens 115 and a CCD line sensor 116 as a photoelectric converting device.

This original scanning portion 113 and 114 is composed of first and second scanner units 113 and 114. First scanner unit 113 has an exposure lamp for illuminating the original image surface and a first mirror for deflecting the reflected image of light from the original in the predetermined direction and moves in a reciprocating manner in parallel with, whilst being kept a certain distance away from, the undersurface of original table 111 at the predetermined speed. Second scanner unit 114 has second and third mirrors which deflect the reflected light image from the original, deflected by first mirror of first scanner unit 113 in the predetermined direction and moves in a reciprocating manner at a speed related to that of first scanner unit 113 and in parallel thereto.

Optical lens 115 reduces the reflected light image from the original, deflected by third mirror of the second scanner unit 114, so that the reduced light image will be focused on the predetermined position on CCD line sensor 116.

CCD line sensor 116 photoelectrically converts the focused light image into an electric signal and outputs it. CCD line sensor 116 is a three-line color CCD which can read monochrome or color images and output line data as to color separation components R(red), G(green) and B(blue). The original image information thus obtained as the electric signal from this CCD line sensor 116 is further transferred to an unillustrated image processor where the predetermined image data processes are performed.

Next, the configuration of image forming portion 210 and the configuration of the components related to image forming portion 210 will be described.

Provided below image forming portion 210 is a paper feeding mechanism 211 which separates paper (transfer medium) P, one by one, from a stack of paper held in a paper tray and feeds it toward image forming portion 210. The paper P thus separated and fed sheet by sheet is delivered into image forming portion 210 with its timing controlled by a pair of registration rollers 212 located before image forming portion 210. The paper P with an image formed on its one side is conveyed and re-fed to image forming portion 210 in time with image forming of image forming portion 210.

Arranged under image forming portion 210 is a image transfer-conveyance belt mechanism 213. Image transfer-conveyance belt mechanism 213 is composed of a driving roller 214, an idle roller 215 and a image transfer-conveyance belt 216 wound and tensioned between the two rollers so as to convey paper P being attracted to the belt by electrostatic force. Further, a pattern image detecting unit 230 is provided under and in proximity to image transfer-conveyance belt 216.

Arranged in the paper conveyance path, downstream of image transfer-conveyance belt mechanism 213 is a fixing unit 217 for fixing the toner image transferred on paper P onto paper P. Paper P having passed through the nip between a pair of fixing rollers of fixing unit 217 passes through a conveyance direction switching gate 218 and is discharged by discharge rollers 219 to a paper output tray 220 attached to the outer wall of copier body 1.

This switching gate 218 selectively connects the conveyance path of paper P after fixing with either the path to discharge paper P to the outside of copier body 1 or the path to recirculate paper P toward image forming portion 210. The paper P which is designated to be conveyed again to image forming portion 210 by means of switching gate 218 is inverted the head and tail by means of a switch-back conveyance path 221 and then re-fed to image forming portion 210.

Arranged above, and in proximity to, image transfer-conveyance belt 216 in image forming portion 210 are the first image forming station Pa, the second image forming station Pb, the third image forming station Pc and the fourth image forming station Pd, in the above mentioned order from the upstream side of the paper conveyance path.

Transfer conveyance belt 216 is frictionally driven by driving roller 214 in the direction indicated by arrow Z in FIG. 1, and carries paper P which is fed by paper feeding mechanism 211 as stated above and sequentially conveys it to image forming stations Pa to Pd.

All the image forming stations Pa to Pd are of a substantially identical configuration. Each image forming station Pa, Pb, Pc and Pd has a photosensitive drum 222a, 222b, 222c and 222d, which is driven in the rotational direction indicated by arrow F in FIG. 1.

Provided around each photosensitive drum 222a to 222d, are a primary charger 223a, 223b, 223c and 223d for uniformly charging photosensitive drum 222a, 222b, 222c and 222d, a developing unit 224a, 224b, 224c and 224d for developing the static latent image formed on photosensitive drum 222a, 222b, 222c and 222d, a transfer charger 225a, 225b, 225c and 225d for transferring the developed toner image on photosensitive drum 222a, 222b, 222c and 222d to paper P, cleaning unit 226a, 226b, 226c and 226d for removing the leftover toner from photosensitive drum 222a to 222d, in this order with respect to the rotational direction of each photosensitive drum 222a, 222b, 222c and 222d.

Arranged above photosensitive drums 222a to 222d are laser beam scanner units 227a, 227b, 227c and 227d, respectively. Each laser beam scanner unit 227a to 227d includes: a semiconductor laser element (not shown) for emitting a spot beam modulated in accordance with the image data; a polygon mirror (deflecting device) 240 for deflecting the laser beam from the semiconductor laser element, in the main scan direction; an f-theta ($\theta$) lens 241 for focusing the laser beam deflected by polygon mirror 240 onto the surface of photosensitive drum 222a to 222d; and mirrors 242 and 243.

The pixel signal corresponding to the black component image of a color original image is supplied to laser beam scanner unit 227a; the pixel signal corresponding to the cyan color component image of a color original image is supplied to laser beam scanner unit 227b; the pixel signal corresponding to the magenta color component image of a color original image is supplied to laser beam scanner unit 227c; and the pixel signal corresponding to the yellow color component image of a color original image is supplied to laser beam scanner unit 227d.

In this arrangement, the static latent images corresponding to the color separations of the original image information are formed on photosensitive drums 222a to 222d. Developing units 224a, 224b, 224c and 224d hold black toner, cyan color toner, magenta color toner, yellow color toner, respectively. The static latent image on photosensitive drum 222a to 222d is developed by the toner of a corresponding color. Thus, the color separations of the original image information, color converted by image forming portion 210, are reproduced as toner images of different colors.

Provided between the first image forming station Pa and paper feeding mechanism 211 is a paper-attraction (brush) charger 228, which electrifies the image transfer-conveyance belt 216 surface so that paper P fed from paper feeding mechanism 211 can be conveyed without any slip or slide, whilst being reliably attracted to image transfer-conveyance belt 216, from the first image forming station Pa to the fourth image forming station Pd.

An erasing device (not illustrated) is arranged approximately directly above driving roller 214 located between the fourth image forming station Pd and fixing unit 217. Applied to this erasing device is an alternating current for separating paper P electrostatically attracted to image transfer-conveyance belt 216, from the belt.

Figure 2:
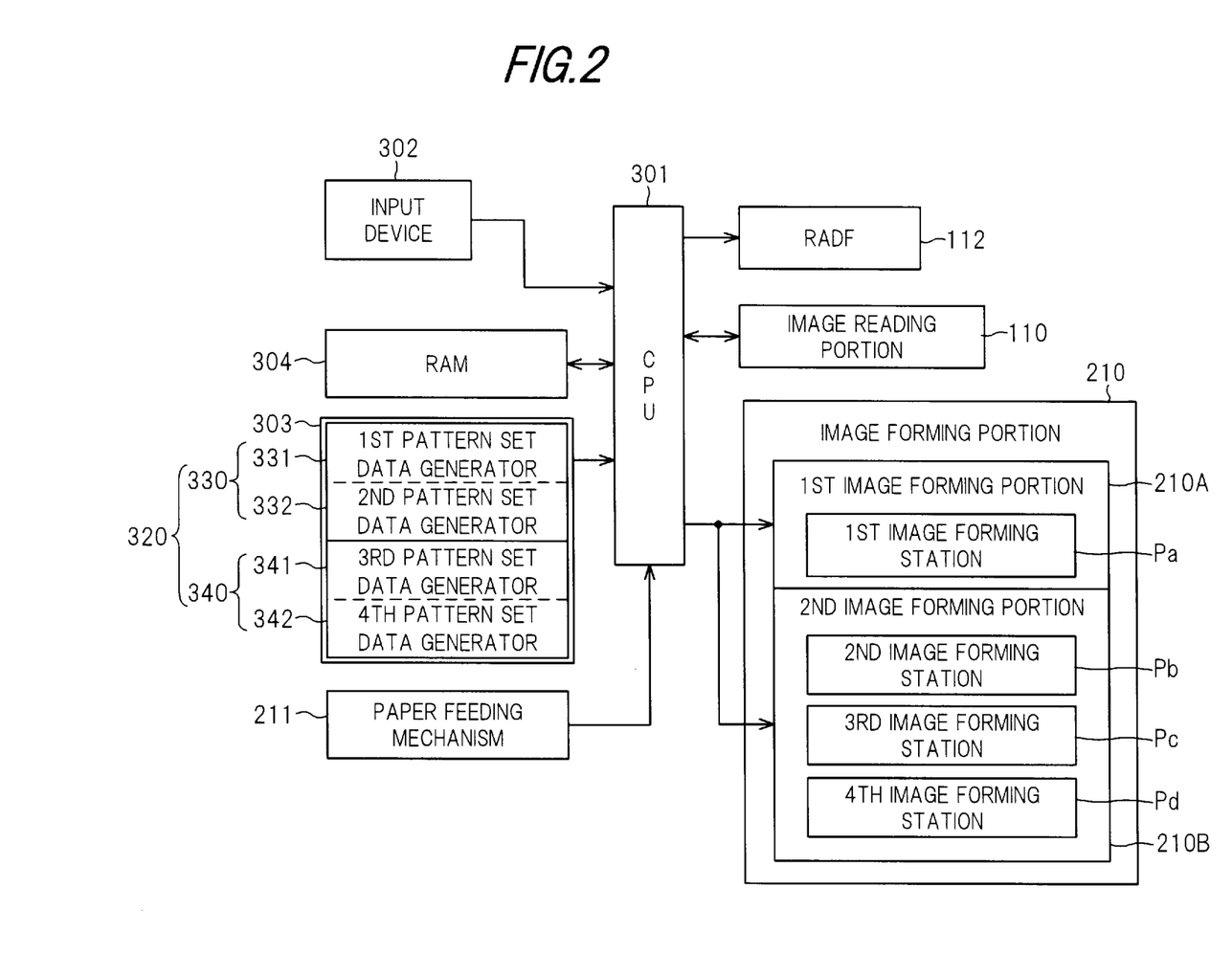
FIG. 2 is a block diagram showing the schematic configuration of a control circuit of the digital color copier shown in FIG. 1.

FIG. 2 is a block diagram showing the schematic configuration of the control circuit of the digital color copier.

In this diagram, 301 designates a CPU as a control means for controlling the operations of components to be described later. Connected to the CPU on its input side is an input device 302 such as a keyboard through which various data, instructions, etc., are input. Connected also to CPU 301 are a ROM 303 storing predetermined programs and data and a RAM 304 as a reproduction image data generating means for temporarily storing data. Further, the aforementioned paper feeding mechanism 211, RADF 112, image reading portion 110 and image forming portion 210 and the like are connected to the output side of CPU 301.

Image forming portion 210 is configured of a first image forming portion 210A and a second image forming portion 210B. The first image forming portion 210A is formed of first image forming station Pa. The second image forming portion 210B is formed of second, third and fourth image forming stations Pb, Pc and Pd.

The aforementioned RAM 304 temporarily stores the image data picked up by image reading portion 110 and the like. ROM 303 has a registration pattern data storage 320 which has stored the data for forming the aftermentioned registration patterns. Registration pattern storage 320 is composed of first, second, third and fourth pattern data generators 331, 332, 341, 342 respectively storing the first, second, third and fourth pattern sets of data, described later. Further, first and second pattern data generators 331 and 332 form a pattern set data generating portion 330 for rough order error estimation while third and fourth pattern data generators 341 and 342 form a data generating portion 340 for fine order error estimation.

In the thus configured digital color copier, cut-sheet type paper is used as paper P. When paper P is delivered from the paper feed cassette to the guide of the paper conveyance path of paper feeding mechanism 211, the leading edge of paper P is detected by a sensor (not shown), which outputs a detection signal, based on which a pair of registration rollers 212 briefly stop the paper.

Then, paper P is delivered in synchronization with image forming stations Pa to Pd, onto image transfer-conveyance belt 216 rotating in the direction of arrow Z in FIG. 1. Meanwhile, image transfer-conveyance belt 216 has been charged in a predetermined manner by paper attraction charger 228 as stated above, so that paper P is stably fed and conveyed throughout the passage of all the image forming stations Pa to Pd.

In each image forming station Pa to Pd, the toner image of each component color is formed so that the different color images are superimposed on the surface of paper P which is conveyed whilst being electrostatically attracted by image transfer-conveyance belt 216. When transfer of the image formed by the fourth image forming station Pd is completed, paper P is separated by virtue of the erasing device, continuously starting at its leading edge, from image transfer-conveyance belt 216 and introduced into fixing unit 217. Finally, paper P having the toner image fixed thereon is discharged through the paper discharge port (not shown) onto paper output tray 220.

In the above description, writing to the photosensitive member is performed by laser beam scanning exposure using laser beam scanner units 227a to 227d. However, instead of the laser beam scanner units, another type of optical writing system made up of light emitting diodes with a focusing lens array (LED head) may be used. An LED head is smaller in size compared to a laser beam scanner unit and has no moving parts hence is silent. Therefore, this LED head can be preferably used for image forming apparatuses such as digital color copiers of a tandem arrangement type needing multiple optical writing units.

In the digital color copier of the present embodiment, when the power of the copier is turned on (the copier is activated) or when the predetermined number of copies are reached, each of image forming stations Pa through Pd creates a registration pattern on paper P for its component color so as to judge whether there is any misregistration in the image by observing these registration patterns.

Figure 3:
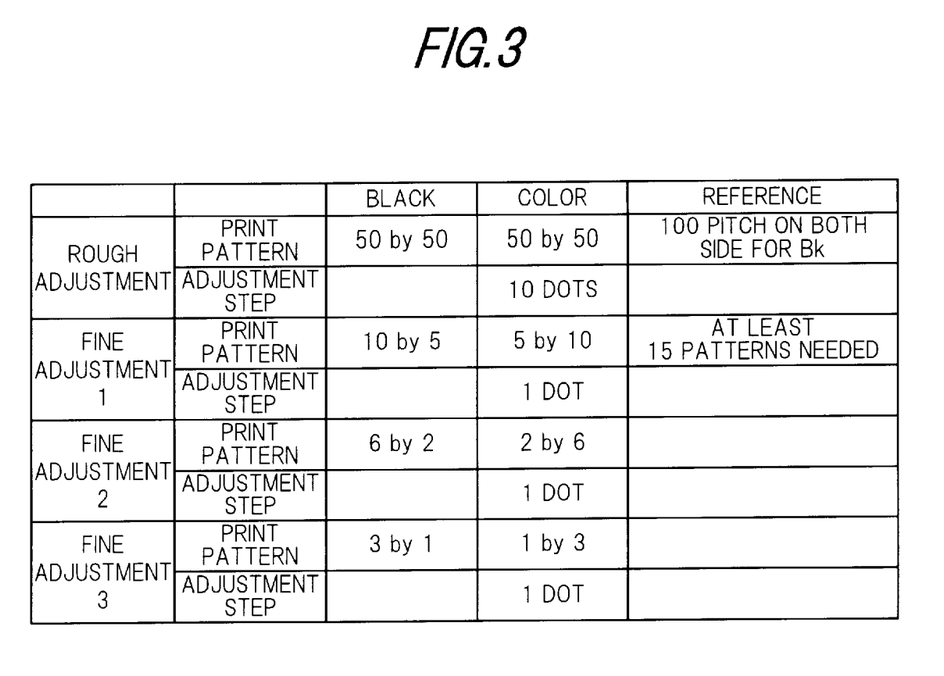
FIG. 3 is an illustrative view showing the contents of registration patterns data stored in the registration pattern generator shown in FIG. 2.
Figure 5A:
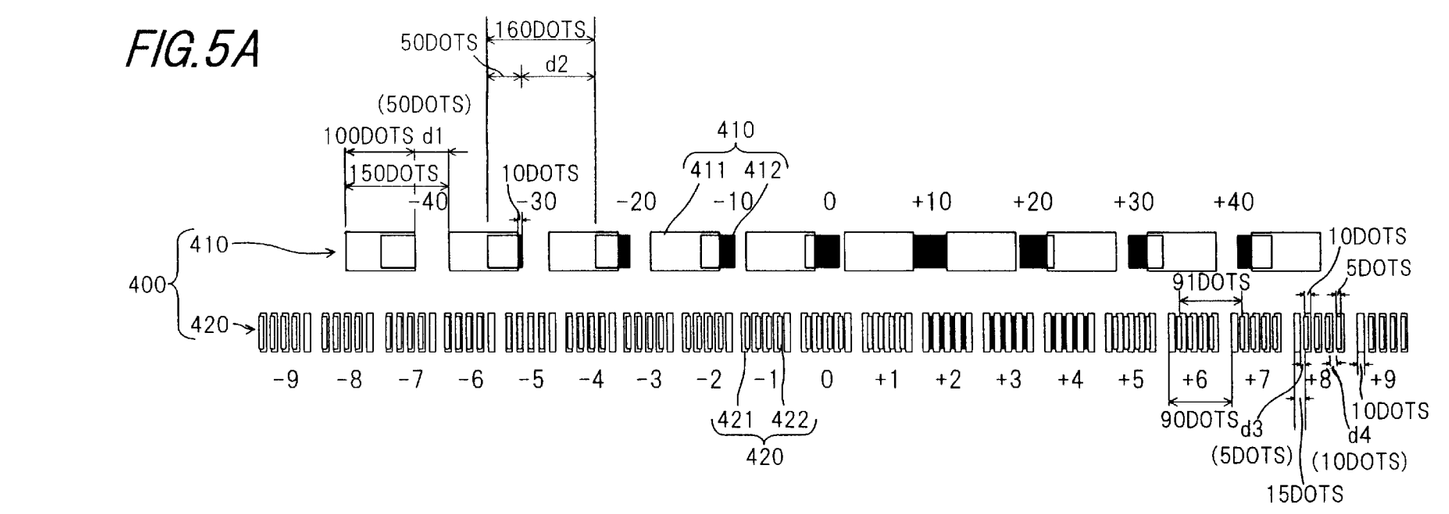
FIG. 5A is an enlarged plan view showing part of the registration pattern shown in FIG. 4.

FIGS. 3 and 5 show an example of a registration pattern 400 formed in this embodiment.

Registration pattern 400 in this embodiment is composed of a first pattern set 410 for rough order error estimation and a second pattern set 420 for fine order error estimation. First pattern set 410 is a combination of a first rectangular pattern 411 and a second rectangular pattern 412 (FIG. 5). First rectangular pattern 411 is formed of first color rectangles with a first coloring material (black in this example) and second rectangular pattern 412 is formed of second color rectangles with a second coloring material (cyan in this example).

Second pattern set 420 is a combination of a third rectangular pattern 421 and a fourth rectangular pattern 422 (FIG. 5). Third rectangular pattern 421 is formed of first color rectangles of the first coloring material (black) and fourth rectangular pattern 422 is formed of a second color rectangles of the second coloring material (cyan).

As shown in FIG. 5A, a plurality of first rectangles forming the rectanglar pattern 411 are arranged d1 apart from each other, forming the first pattern subset; a plurality of second rectangles forming the rectanglar pattern 412 are arranged d2 apart from each other, forming the second pattern subset; a plurality of third rectangles forming the rectanglar pattern 421 are arranged d3 apart from each other, forming the third pattern subset; and a plurality of fourth rectangles forming the rectanglar pattern 422 are arranged d4 apart from each other, forming the fourth pattern subset. Rough error estimation pattern set 410 is formed by the combination of the first pattern subset and the second pattern subset while fine error estimation pattern set 420 is formed by the combination of the third pattern subset and fourth pattern subset.

Data as to registration pattern 400 as stated above is stored beforehand in registration pattern storage 320 in ROM 303 (FIG. 2) and the data of the registration pattern is read out as appropriate by its output instructions so that the pattern will be formed on Paper P.

Figure 4:
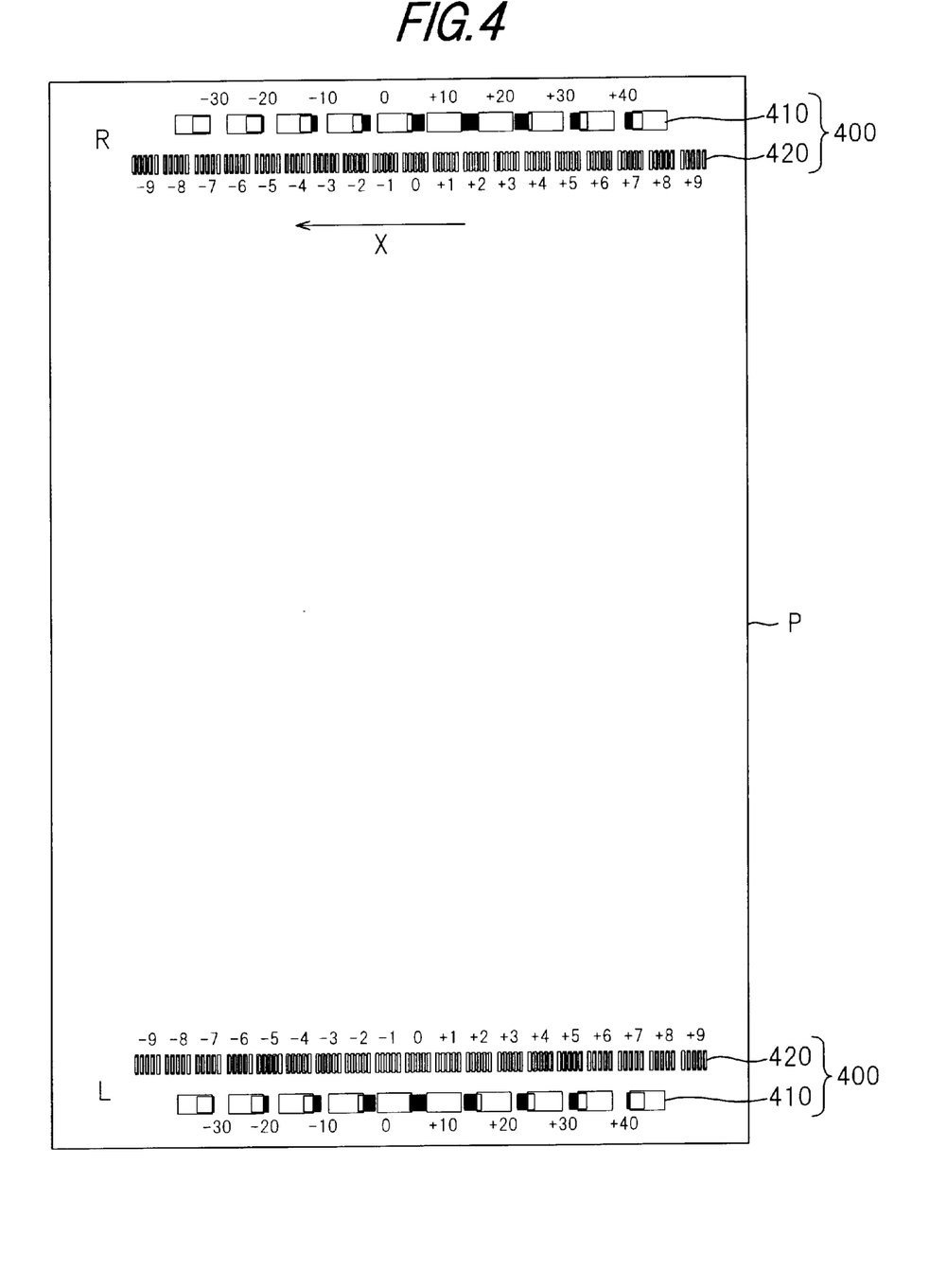
FIG. 4 is a plan view showing one example of a registration pattern formed on the paper by the machine shown in FIG. 1, where the rectangular pattern formed by a chromatic coloring material is not in register.

That is, first, based on the data from ROM 303, black rectangles (the first rectangular pattern image) are written in photosensitive drum 222a by laser beam scanner unit 227a so as to be recorded on paper P, then the rectangular patterns (the second rectangular pattern image) of a component color, one of Y, M and C, to be checked as to color misregistration are written in one of photosensitive drums 222b to 222d by a corresponding one of laser beam scanner units 227b to 227d so that the color pattern is superimposed on the black pattern on the paper P being conveyed from photosensitive drum 222a. As a result, in this embodiment, registration pattern 400 is produced on both left and right sides L and R of paper P along the auxiliary direction X, as shown in FIG. 4.

Referring to FIG. 5A, in rough error estimation pattern set 410 shown herein, a plurality of rectangles formed by the black coloring material, each have a width of 100 dots and are arranged with a (line) pitch of 150 dots, thus forming first rectangular pattern 411 (therefore, first pattern interval d1 between the neighboring rectangles in the first rectangular pattern 411 is 50 dots) while a plurality of rectangles formed by a chromatic coloring material, each have a width of 50 dots and are arranged with a pitch of 160 dots, thus forming second rectangular pattern 412 (therefore, second pattern interval d2 between the neighboring rectangles in the second rectangular pattern 412 is 110 dots). In this way, two kinds of rectangular patterns are formed with their pitches 10 dots different, which is one-fifth of the first pattern interval d1 (=50 dots) between the rectangles of the first rectangular pattern 411, so that misregistration between the two rectangular patterns can be roughly determined with an order of 10 dot units.

For example, when the two rectangular patterns are in register with each other, second rectangular pattern 412 is positioned so the rectangle in pattern 412 fully appears and snugly fits in the first pattern interval d1 in first rectangular pattern 411 at the center indicated by '0', as shown in FIG. 5B. On the contrary, if second rectangular pattern 412 is deviated 13 dots rightward from first rectangular pattern 411, the rectangle in pattern 412 maximally appears in the first pattern interval d1 in first rectangular pattern 411 at the position indicated by '+10'. In FIG. 5A, the rectangle in first rectangular pattern 411 seems to just fit within the interval. This is only the case where the second rectangular pattern 412 is shifted exactly +10 dots. Actually, however, second rectangular pattern 412 is as a whole shifted 3 dots more to the left.

In this way, second rectangular pattern 412 is found to be deviated +10 dots (in base units of ten) from first rectangular pattern 411. In order to confirm the deviation in base units of one, fine error estimation pattern set 420 is used. In this fine error estimation pattern set 420 shown here, a plurality of rectangles formed by the black coloring material, each have a width of 10 dots and are arranged with a pitch of 15 dots, thus forming third rectangular pattern 421. Therefore, third pattern interval d3 between the neighboring rectangles in the third rectangular pattern 421 is 5 dots. This is one-tenth of the first pattern interval d1. Further, in this embodiment, five of the rectangles in third rectangular pattern 421 are grouped as one unit and this unit is repeated with a pitch of 90 dots.

On the other hand, fourth rectangular pattern 422 is formed of a plurality of rectangles by a chromatic coloring material, each having a width of 5 dots and being arranged with a pitch of 15 dots. Therefore, the fourth interval d4 between the neighboring rectangles in the fourth rectangular pattern 422 is 10 dots, which is one-eleventh of the second pattern interval d2. Further, in this embodiment, four of the rectangles in fourth rectangular pattern 422 are grouped as one unit and this unit is repeated with a pitch of 91 dots. In this way, two kinds of rectangular patterns are formed with their pitches 1 dot different, which is one-fifth of the interval d3 (=5 dots) between the rectangles in the third rectangular pattern, so that relatively misregistration between two rectangular patterns 421 and 422 can be finely determined in the order of 1 dot units.

For example, when the two rectangular patterns 421 and 422 are in register with each other, fourth rectangular pattern 422 is positioned so the rectangles in pattern 422 snugly fit the intervals within the unit in third rectangular pattern 421 at the position indicated by '0', as shown in FIG. 5B. On the contrary, if fourth rectangular pattern 422 is deviated 13 dots rightward from third rectangular pattern 421, the rectangles in fourth pattern 422 maximally appear in the intervals within the unit in third rectangular pattern 421 at the position indicated by '+3'. In this way, fourth rectangular pattern 422 is found to be deviated +3 dots (in base units of one) from third rectangular pattern 421. In the overlapped arrangement of the two patterns or, the overlapped states between the two different units will repeat periodically every 15 units. Therefore, each pattern needs to have at least 15 units.

Thus, the rectangular pattern set of the second color has been found to deviate +13 dots from the rectangular pattern set of the first color by using registration pattern 400 (FIG. 4) which is configured of rough error estimation pattern set 410 and fine error estimation pattern set 420. Then, this value, i.e., +13 dots, is input as the correction information through input device 302 (FIG. 2) such as a control panel etc. So, as shown in FIGS. 1 and 2, based on the input instructions, CPU 301 as the controlling means compensates for laser scanner units 227b to 227d and photosensitive drums 222b to 222d in first through fourth image forming means Pa to Pd. Thus, the pattern shown in FIG. 5B is obtained as the registration pattern 400 output after correction, instead of that in FIG. 5A.

Figure 6A:
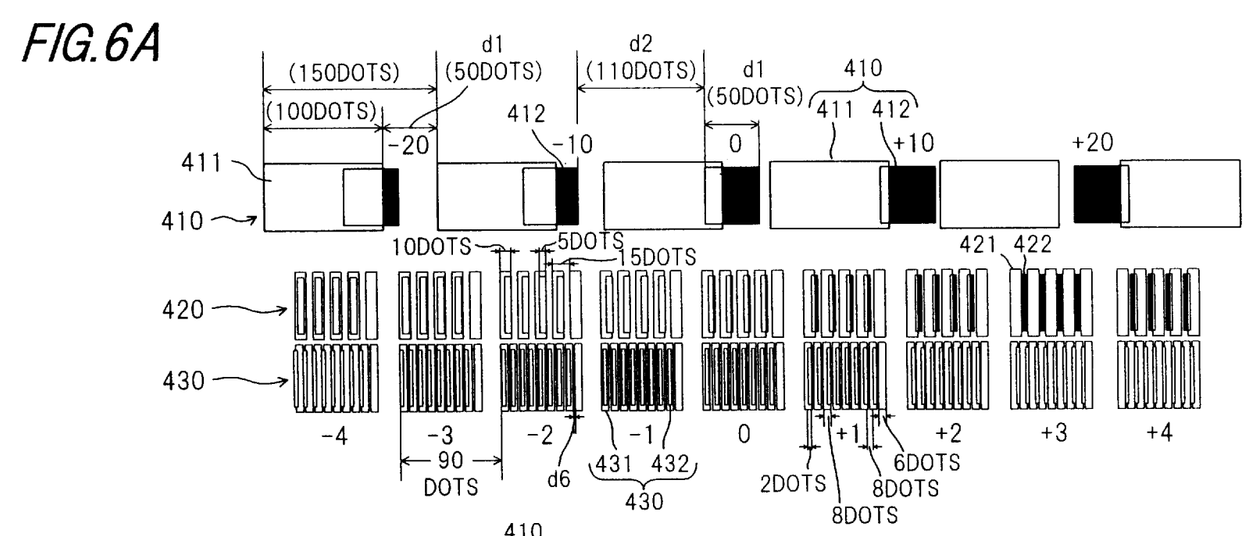
Figure 6B:
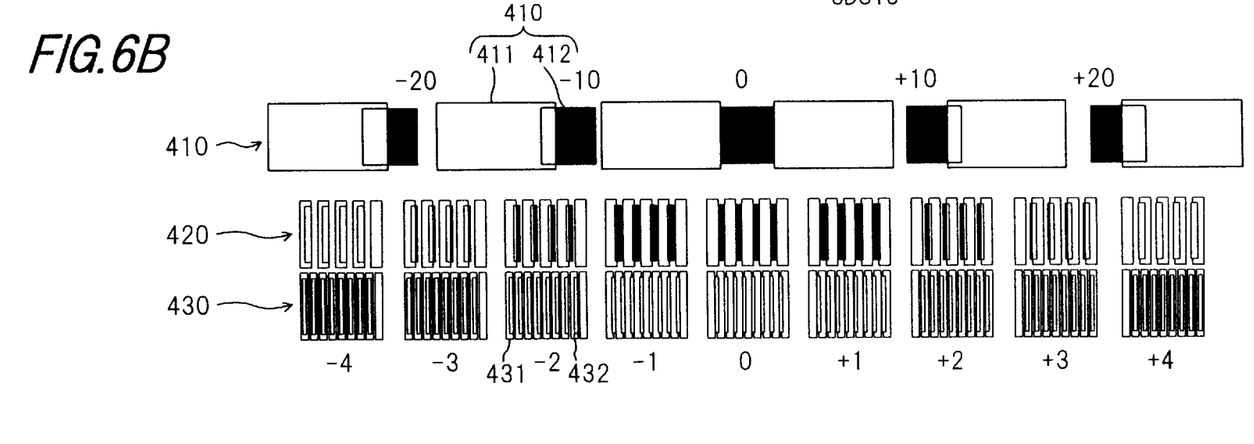

In the above description, registration pattern 400 is composed of one rough error estimation pattern set 410 and one fine error estimation pattern set 420. However, in order to more exactly and more easily determine the input color misregistration in fine adjustment, it is possible to add a second fine error estimating pattern set for determining the error or misregistration in image formation by a smaller unit. That is, as shown in FIG. 6A, in the first fine error estimation pattern set 420, it seems that the rectangles in fourth rectangular pattern 422 snugly fit the intervals within all the units residing at +2, +3 and +4 in third rectangular pattern 421. Therefore, in order to exactly determine where the rectangles snugly fit, a second fine error estimation pattern set 430 is added as shown in FIG. 6 so as to determine further fine order misregistration in image formation by checking the positional relationship between fifth and sixth rectangular patterns 431 and 432.

In this embodiment, the rectangles in fifth rectangular pattern 431 each have a width of 6 dots and are arranged with a pitch of 8 dots, and nine of the rectangles are grouped as one unit and this unit is repeated with a pitch of 90 dots. On the other hand, sixth rectangular pattern 432 is formed of a plurality of rectangles, each having a width of 2 dots and being arranged with a pitch of 8 dots, and eight of the rectangles are grouped as a unit and this unit is repeated with a pitch of 91 dots.

By this unit configuration, it is possible to easily find that the rectangles in sixth rectangular pattern 432 snugly fit the intervals d6 within the unit located at +3 in fifth rectangular pattern 431. The registration pattern obtained after correction as a result of this correction information presents the registration pattern shown in FIG. 6B.

By a similar principle, third, fourth . . . the n-th fine adjustment patterns may be provided so as to perform further enhanced and more easy determination of misregistration in the image formation.

In the above description, the error or misregistration in image formation with respect to the auxiliary scan direction was corrected. However, when the rectangular pattern is rotated 90°, it is also possible to determine misregistration in image formation with respect to the main scan direction so as to correct an inclined error. Further, registration pattern may be formed along both the main and auxiliary scan directions, whereby a further precise correction or prevention of misregistration in image formation can be attained.

As has been described, in the first aspect of the invention, misregistration in image formation of each component color image can be estimated using pattern sets having different units. Therefore, an error can be determined roughly by first checking the pattern set of a larger unit then finely checking the pattern set of a smaller unit, whereby it is possible to perform quick and exact determination of the error. So, this configuration is markedly effective in performing error correction.

In the second aspect of the invention, the registration pattern data generating portion is configured of the rough error estimation pattern set data generating portion and the fine error estimation pattern set data generating portion. Therefore, when an error is determined, at first the rough error estimation pattern set is checked so as to determine the rough value of the error and then the fine error estimation pattern set is checked so as to determine the fine value of the error. Therefore, in this invention, checking only the two pattern sets enables exact determination of an error across two, larger and smaller units, making it possible to perform exact and fast misregistration determination.

In the third aspect of the invention, use of the fine error estimation pattern set, i.e., the third and fourth pattern set data enables the determination of an error up to 1/N precision of that performed by the rectangular pattern data set for rough order error estimation.

In the fourth aspect of the invention, if the rectangles in the second and fourth rectangular patterns completely fit the intervals of the first and third rectangular patterns, respectively, an error can be determined at first sight without checking the smaller rectangular pattern error, thus making it possible to perform faster and easier determination.

As in the fifth aspect of the invention, when the first coloring material is a black one and the second coloring material is a chromatic one, the overlap between the rectangular pattern of the first color and the rectangular pattern of the second color can be easily recognized, thus enabling a further exact and simple determination.

Further, as in the sixth aspect of the invention, the configuration of a registration pattern along both the main and auxiliary scan directions makes it possible to perform image correction in two orthogonal directions, further enhancing the exactness.

What is claimed is:

1. An image forming apparatus comprising:
   a first image forming portion forming an image on a printing medium with a coloring material of the first color in accordance with an image data;
   a second image forming portion which superimposes a second image formed of a coloring material of the second color in accordance with an image data inputted, over and in register with the image formed on the printing medium by the first image forming portion; and
   a data supplying portion for supplying a predetermined image data to the first and second image forming portions,
   the data supplying portion comprising:
      a reproduction image data generating portion for outputting the data relating to a reproduction image to be formed on the printing medium; and a registration pattern data generating portion for generating registration pattern data for determining the positioning error or misregistration in image formation of the image formed by the second image forming portion relative to a predetermined position of the image reproduced by the first image forming portion,
      the registration pattern data generating portion including a plurality of pattern data generators for generating registration pattern data corresponding to the magnitudes of the error to be estimated,
      each pattern data generator comprising:
         a first-color pattern set data generator for generating a first-color pattern set data which is used to form a plurality of first-color rectangles to be formed with the first color, apart from each other by a first pattern interval; and
         a second-color pattern set data generator for generating a second-color pattern set data which is used to form a plurality of second-color rectangles to be formed with the second color, the width thereof being equal to the first pattern interval, apart from each other by a second pattern interval which is different by a predetermined amount from the first pattern interval,
   wherein misregistration in image formation of the image formed by the second image forming portion relative to the predetermined position of the image formed by the first image forming portion can be estimated based on the positional relationship between a rectangular pattern formed by the first image forming portion based on the first-color pattern set data and a rectangular pattern formed by the second image forming portion based on the second-color pattern set data while each of the pattern data generators generates data enabling determination of an error in different, or larger and smaller units,
   an input portion through which correction information for correcting the error or misregistration in image formation is input; and
   a control portion for controlling at least one of the first and second image forming portions in accordance with the correction information input through the input portion.

2. An image forming apparatus comprising:
   a first image forming portion forming an image on a printing medium with a coloring material of the first color in accordance with an image data;
   a second image forming portion which superimposes a second image formed of a coloring material of the second color in accordance with an image data inputted, over and in register with the image formed on the printing medium by the first image forming portion; and
   a data supplying portion for supplying a predetermined image data to the first and second image forming portions,
   the data supplying portion comprising:
      a reproduction image data generating portion for outputting the data relating to a reproduction image to be formed on the printing medium; and a registration pattern data generating portion for generating registration pattern data for determining the positioning error or misregistration in image formation of the image formed by the second image forming portion relative to a predetermined position of the image reproduced by the first image forming portion,
      the registration pattern data generating portion including a rough error estimation pattern set data generator for estimating a large error and a fine error estimation pattern set generator for estimating a small error,
      the rough error estimation pattern data generator comprising:
         a first pattern set data generator for generating a first pattern set data which is used to form a plurality of first pattern rectangles to be formed with the first color, apart from each other by a first pattern interval; and
         a second pattern set data generator for generating a second pattern set data which is used to form a plurality of second pattern rectangles to be formed with the second color, the width thereof being equal to the first pattern interval, apart from each other by a second pattern interval which is different by a predetermined amount from the first pattern interval,
      the fine error estimation pattern set data generator comprising:
         a third pattern set data generator for generating a third pattern set data which is used to form a plurality of third pattern rectangles to be formed with the first color, apart from each other by a third pattern interval which is smaller than the first pattern interval; and a fourth pattern set data generator for generating a fourth pattern set data which is used to form a plurality of fourth pattern rectangles to be formed with the second color, apart from each other by a fourth pattern interval which is smaller than the second pattern interval, wherein a rough error or misregistration in image formation of the image formed by the second image forming portion relative to the predetermined position of the image formed by the first image forming portion can be estimated based on the positional relationship between a rectangular pattern formed by the first image forming portion based on the first pattern set data and a rectangular pattern formed by the second image forming portion based on the second pattern set data; and a fine error or misregistration in image formation of the image formed by the second image forming portion relative to the predetermined position of the image formed by the first image forming portion can be estimated based on the positional relationship between a rectangular pattern formed by the first image forming portion based on the third pattern set data and a rectangular pattern formed by the second image forming portion based on the fourth pattern set data, an input portion through which correction information for correcting the large and small errors or misregistrations in image formation is input; and a control portion for contolling at least one of the first and second image forming portions in accordance with the correction information input through the input portion.

3. The image forming apparatus according to claim 2, wherein the intervals between neighboring rectangles based on the third and fourth pattern set data are set at 1/N (N is an integer) of the intervals between the neighboring rectangles based on the first and second pattern set data, respectively.

4. The image forming apparatus according to any one of claims 1 through 3, wherein the coloring material of the first color is a black one and the coloring material of the second color is one of the component color material for reproducing a color image.

5. The image forming apparatus according to claim 4, wherein the registration pattern data generating portion generates registration pattern data for forming registration patterns along the auxiliary scan direction or the moving direction of the image transfer-conveyance belt and along the main scan direction that is perpendicular to auxiliary scan direction.

6. The image forming apparatus according to any one of claims 1 through 3, wherein the registration pattern data generating portion generates registration pattern data for forming registration patterns along the auxiliary scan direction or the moving direction of the image transfer-conveyance belt and along the main scan direction that is perpendicular to auxiliary scan direction.

7. The image forming apparatus according to claim 2 or claim 3, wherein the widths of the rectangles in the fourth rectangular patterns are set equal to the intervals between the rectangles in the third rectangular patterns.

8. The image forming apparatus according to claim 7, wherein the coloring material of the first color is a black one and the coloring material of the second color is one of the component color material for reproducing a color image.

9. The image forming apparatus according to claim 7, wherein the registration pattern data generating portion generates registration pattern data for forming registration patterns along the auxiliary scan direction or the moving direction of the image transfer-conveyance belt and along the main scan direction that is perpendicular to auxiliary scan direction.

* * * * *

UNITED STATES PATENT AND TRADEMARK OFFICE
CERTIFICATE OF CORRECTION

PATENT NO. : 6,219,517 B1
DATED : April 17, 2001
INVENTOR(S) : Kazunobu Takahashi, Kyosuke Taka, Hidekazu Sakagami, Nobuo Manabe It is certified that error appears in the above-identified patent and that said Letters Patent is hereby corrected as shown below:

<u>Column 14,</u>
Line 48, after the word "pattern" and before the word "date", add the word -- set --.

Signed and Sealed this

Thirteenth Day of November, 2001

Attest:

NICHOLAS P. GODICI
Attesting Officer    Acting Director of the United States Patent and Trademark Office